United States Patent [19]

Sasaki et al.

[11] Patent Number: 4,583,448
[45] Date of Patent: Apr. 22, 1986

[54] WINDSHIELD DEFROSTER

[75] Inventors: Toshihiro Sasaki; Yasushi Nakagawa; Kazuhiko Miyadera; Toyokazu Hirota, all of Toyota, Japan

[73] Assignee: Toyota Jidosha Kabushiki Kaisha, Aichi, Japan

[21] Appl. No.: 725,552

[22] Filed: Apr. 22, 1985

[30] Foreign Application Priority Data

May 14, 1984 [JP] Japan .................. 59-70210[U]

[51] Int. Cl.⁴ .................................. B60H 1/24
[52] U.S. Cl. ............................ 98/2.08; 98/2.09
[58] Field of Search ...................... 98/2.08, 2.09

[56] References Cited

U.S. PATENT DOCUMENTS 2,154,731  4/1939  Crowley ........................ 98/2.09
3,472,146  10/1969  Mazurkiewicz .
3,608,469  9/1971  Muton et al. .
4,105,246  8/1973  Trumbuil .
4,223,745  2/1980  Mizuno et al. .

FOREIGN PATENT DOCUMENTS 2230775  5/1981  Fed. Rep. of Germany .

173329  10/1983  Japan ........................... 98/2.09

Primary Examiner—Larry I. Schwartz
Attorney, Agent, or Firm—Parkhurst & Oliff

[57] ABSTRACT

A windshield defroster includes a defroster outlet positioned within the dashboard of a vehicle, in which a cover plate is attached within the defroster outlet. The cover plate includes an opening and a plurality of bars which separate the opening into various sections, so that the bars within the cover plate prevent objects from dropping into the defroster outlet. The windshield defroster includes a duct attached to the bottom surface of the dashboard, and a heater is positioned within the duct, so that warm air can be distributed to the defroster outlet through the opening in the cover plate. The cover plate is swingably connected to the duct by a hinge, and the hinge is integrally formed with the duct and the cover plate. The cover plate has a lower surface in the vicinity of the hinge, and the duct has a horizontal first projection in the vicinity of the hinge. The lower surface of the cover plate is in contact with the horizontal first projection of the duct, and the cover plate is thereby horizontally supported without any additional support for the free end of the cover plate.

32 Claims, 20 Drawing Figures

PRIOR ART

Fig. 14

PRIOR ART

WINDSHIELD DEFROSTER

BACKGROUND OF THE INVENTION

The present invention relates to a windshield defroster for a vehicle, and more particularly to improvements in a screen for preventing an object from dropping into a defroster duct through a defroster outlet formed in a top surface of a dashboard of the vehicle.

U.S. application Ser. No. 724,545, filed Apr. 18, 1985, which is herein incorporated by reference, is contemporaneous with this application and discloses a windshield defroster having a plate or rudder secured to a defroster duct to control the flow of heated air. In another embodiment the plate or rudder is also secured to a screen which is attached to the defroster duct.

Figure 13:
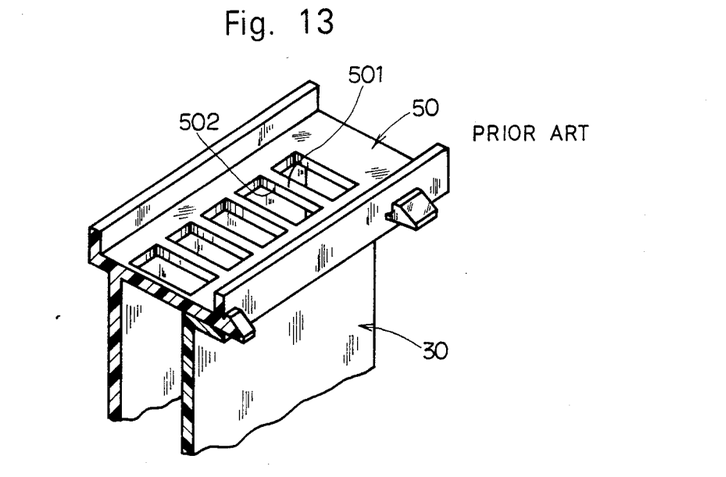
FIG. 13 is an enlarged perspective view showing the arrangement of components disposed around the screen disclosed in Japanese Utility Model Application Laid-open No. Showa 51-82236.
Figure 14:
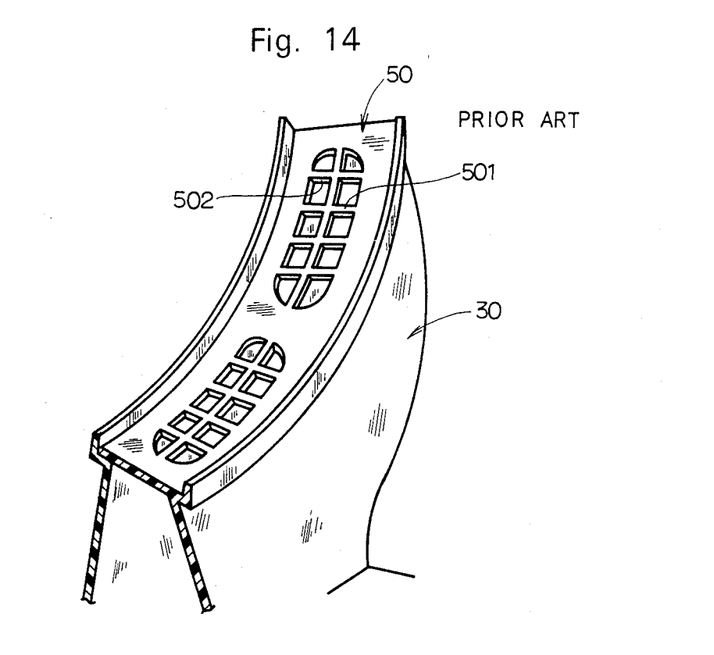
FIG. 14 is an enlarged perspective view showing the arrangement of components around another screen disclosed in Japanese Utility Model Application Laid-open No. Showa 51-82236.
Figure 15:
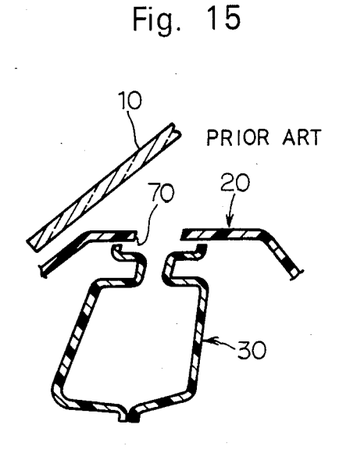
FIG. 15 is a cross-sectional view showing components of a third conventional windshield defroster.
Figure 16:
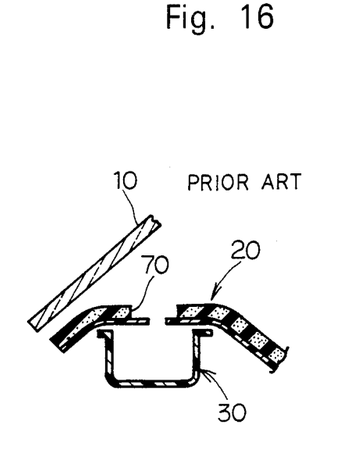
FIG. 16 is a cross-sectional view showing components of a fourth conventional windshield defroster.

FIGS. 13 and 14 show a prior art approach disclosed in Japanese Utility Model Application Laid-open No. Showa 51-82236. As illustrated in FIGS. 13 and 14, a windshield defroster includes a duct 30 and a screen 50 having a plurality of openings 502 and a plurality of bars 501. The screen 50 is disposed on one end of the duct 30, and the screen 50 is integrally and rigidly formed with duct 30.

However, in fact, it is very difficult to form the defroster duct 30 which has the integral and rigid screen 308. Therefore, generally, the screen 308 is separated from the defroster duct 30. Accordingly, the screen 50 which prevents an object from dropping into the duct 30, must be fixed to the duct 30 prior to the windshield defroster being installed into the dashboard of the vehicle. Further, screen 50 covers the entire outlet area of the duct 30, so that screen 50 must be large and heavy. Therefore, even if it is possible to form the defroster duct 30 having the integral, rigid and entirely covered screen 308, this prior art approach increases the material and labor requirements during installation of the duct 30 under the dashboard 20.

FIGS. 15 through FIG. 20 show other prior art approaches. Windshield defrosters shown in FIGS. 15, 16 and 18 do not utilize a screen for preventing an object from dropping into the defroster duct 30.

Figure 17:
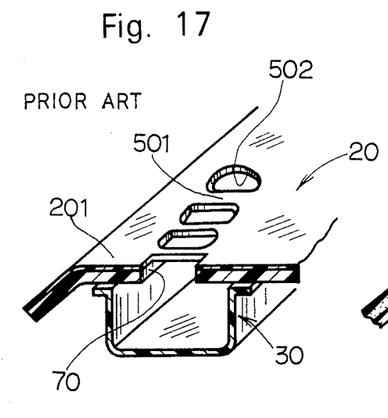
FIG. 17 is a cross-sectional view showing components of a fifth conventional windshield defroster.
Figure 18:
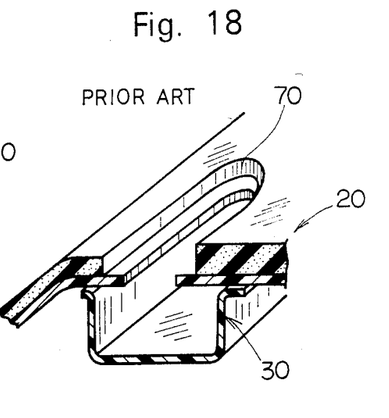
FIG. 18 is a cross-sectional view showing components of a sixth conventional windshield defroster.

The windshield defroster shown in FIG. 17 includes a plurality of openings 502 and a plurality of bars 501 provided in the top surface 201 of dashboard 20. While the windshield defroster shown in FIG. 17 can prevent an object from dropping into the defroster duct 30, it is very difficult to align the openings 502 and bars 501 within the top surface 201 of dashboard 20 with the defroster outlet 70 in the dashboard 20.

Figure 19:
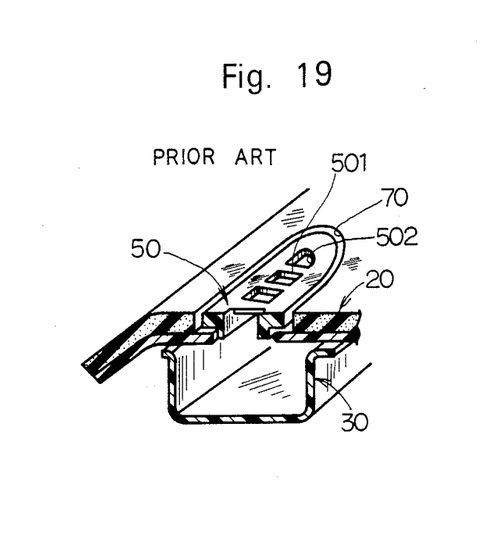
FIG. 19 is a cross-sectional view showning components of a seventh conventional windshield defroster.
Figure 20:
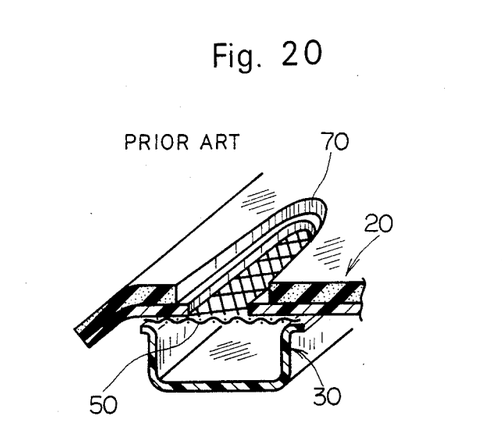
FIG. 20 is a cross-sectional view showing components of an eighth conventional windshield defroster.

The windshield defroster shown in FIG. 19 has a separate screen 50 which is placed within the defroster outlet 70 of the dashboard 20. The screen 50 includes a plurality of bars 501 and a plurality of openings 502. Furthermore, the windshield defroster shown in FIG. 20 has a separate net-type screen 50. Both of these windshield defrosters include a screen 50 which is separated from the dashboard 20 and duct 30, so that each windshield defroster consists of many components and it is therefore necessary for the installer to assemble many components to the dashboard 20, before the duct 30 is installed under the dashboard 20.

SUMMARY OF THE INVENTION

The present invention has been developed to overcome the disadvantages described above. One object of the present invention is to provide a windshield defroster which prevent an object from dropping into a duct through a defroster outlet. Another object is to provide a windsheld defroster duct which requires very little material and therefore lightens the weight of the vehicle.

Another object is to provide of a windshield defroster in which it is easy to install a screen in the windshield defroster duct without spending much time or labor.

In order to accomplish the above-described objects, a windshield defroster according to the present invention includes a defroster duct having a first outlet and a screen integrated to the duct. The defroster outlet is formed on the top surface of the dashboard of a vehicle. The duct is secured to the bottom surface of the dashboard. Between the bottom surface of the dashboard and the upper peripheral edge of the duct, a screen is disposed. The screen has a first edge which is connected to the upper peripheral edge of the duct by a hinge, and this hinge is integral with the screen and the duct. The screen is not separable from the duct so that this windshield defroster does not include many components and it is not necessary for the defroster installer to assemble many components within the dashboard. The screen is not rigid and the screen is swingable on the duct by a hinge, so that it is easy to form the duct which have the integrally hinged screen.

Each screen has a free edge or a second edge which is positioned within the outlet which is defined within the upper peripheral edge of the duct. Since most of the outlet of the duct is not covered by the screen, the duct does not require a lot of excess materials and therefore the duct is lighter thereby reducing the weight of the vehicle.

The duct has a first projection which extends horizontally from the upper peripheral edge, and the screen has a lower surface which is in contact with the horizontal surface of the first projection of the duct. Furthermore, the hinge, described above, connects a front edge of the first projection to one edge of the screen. The screen is supported by the first projection of the duct and the hinge, and the screen extends horizontally without any additional support for the free edge of the screen. Thus, it is not necessary for the installer to fix the screen on the upper peripheral edge of the duct, and it is only necessary for the installer to bend back the screen on the upper peripheral edge of the duct along the hinge, before the duct is installed under the dashboard.

The screen includes a protrusion on the lower surface thereof, and the upper peripheral edge of the duct has a recess. A pair of blocks are raised from the bottom surface of the recess. The protrusion is inserted into the recess and the protrusion is therefore in frictional contact with the pair of blocks, so that the screen can not rotate about the hinge, and the screen does not make any noise on the upper peripheral edge of the duct or the bottom surface of the dashboard. Furthermore, it is easy to install the duct under the dashboard, because it is not necessary for the installer to concern himself with the screen.

It is noted that instead of a single screen, a plurality of screens could be integrated into the duct. In this case, each screen would have an edge which is connected to the upper peripheral edge of the duct by a hinge.

Also, it is clear that a plurality of defroster outlets, with their respective defroster ducts and screens, could be positioned across the dashboard of a vehicle.

BRIEF DESCRIPTION OF THE DRAWINGS

Additional objects and novel features of this invention will become more apparent from the description which follows taken in conjunction with the accompanying drawings, wherein like reference numerals denote like elements, and in which.

DETAILED DESCRIPTION OF THE PREFERRED EMBODIMENTS

Figure 1:
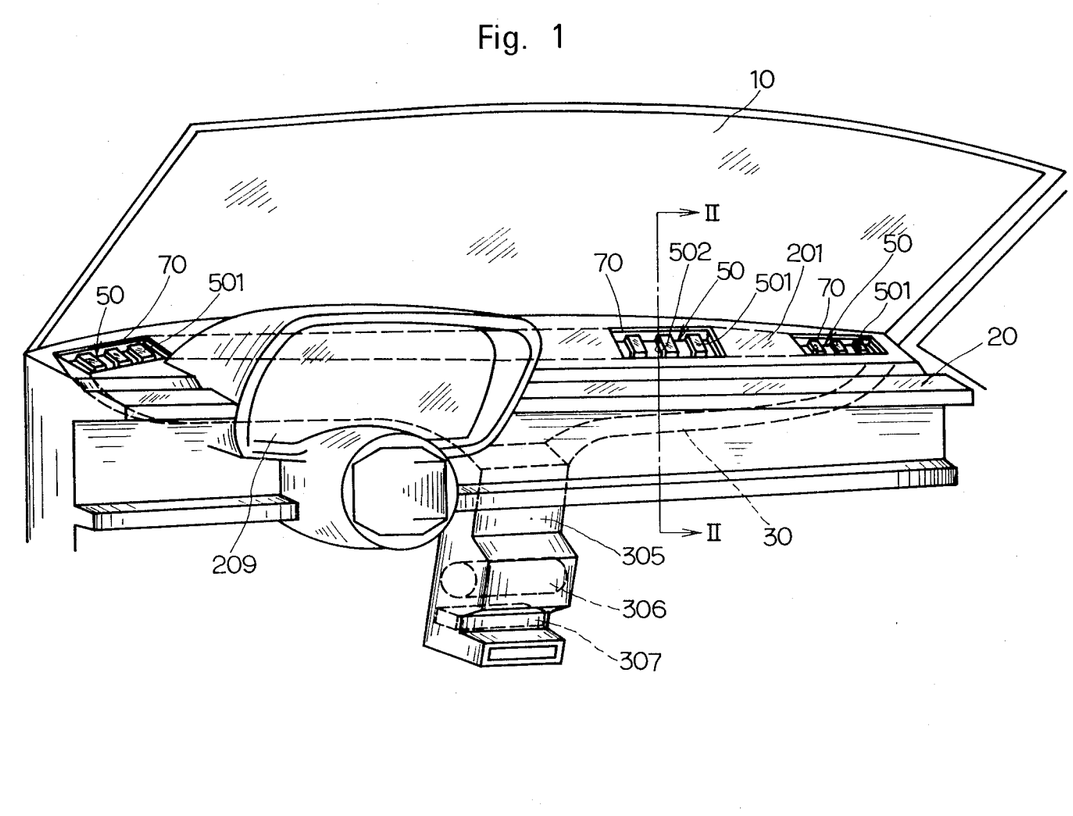
FIG. 1 is a perspective view showing a windshield defroster according to the present invention.

Referring to FIG. 1, a dashboard 20 is positioned at the frontward portion of a passenger compartment of a vehicle and the dashboard 20 extends in the lateral direction between the sides of the vehicles. A top surface 201 of the dashboard 20 is located under a windshield 10, and the top surface 201 of the dashboard 20 extends horizontally. The top surface 201 includes a plurality of defroster outlets 70 and each defroster outlet 70 has a plurality of bars 501 therein. These bars 501 prevent an object from dropping into the defroster outlet 70, and these bars 501 are fixed on a screen or cover plate 50. The screen or cover plate 50 includes an opening 502 under the bars 501, and the bars 501 cross over the opening 502. The bars 501 extend in a direction perpendicular to the greatest extent of the dashboard 20, and the bars 501 separate the opening 502 into various sections. The dashboard 20 includes an instrument panel 209 on a rear portion thereof, and a first duct 30 is positioned under the dashboard 20. A second duct 305, a blower 306 and a heater 307 are arranged under the first duct 30.

Figure 2:
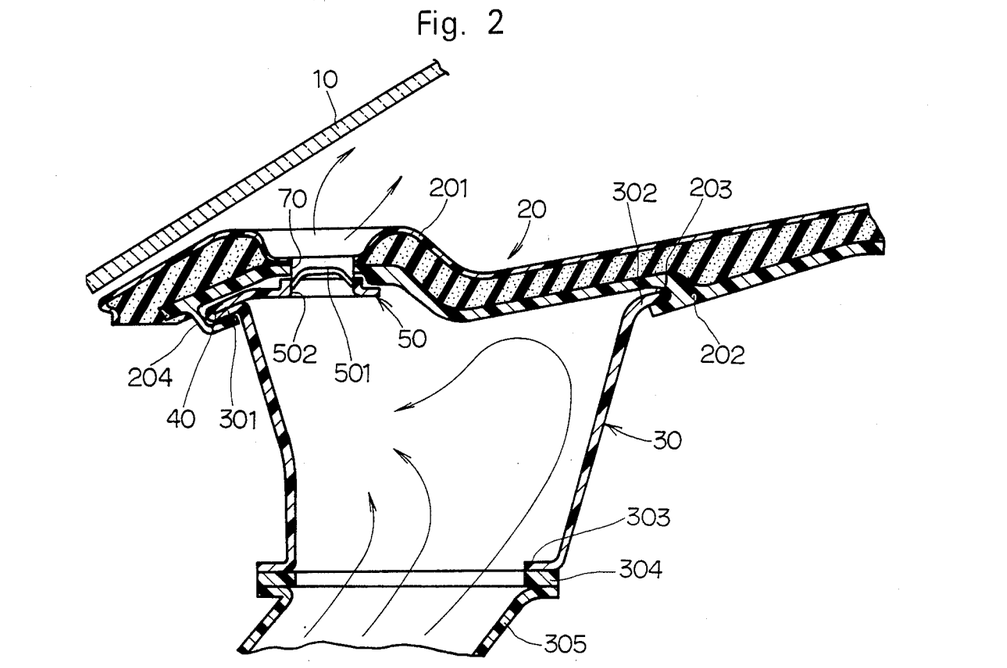
FIG. 2 is an enlarged cross-sectional view of the windshield defroster of a first embodiment taken along the line II—II in FIG. 1.
Figure 3:
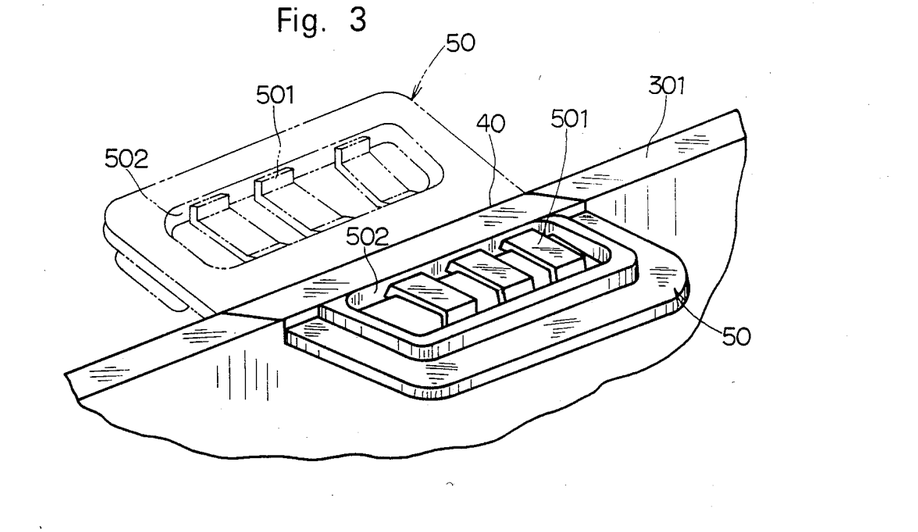
FIG. 3 is an enlarged partial perspective view showing the arrangement of components around the defroster outlet of the first embodiment.

As shown in FIGS. 2 and 3, a defroster outlet 70 is placed in the top surface 201 of dashboard 20, in the front portion of the dashboard 20. The dashboard 20 has a recess 203 and a hook 204 on the bottom surface 202 thereof. The recess 203 is located on the central portion of the bottom surfaces 202 of the dashboard 20 toward the rear of the vehicle, and the recess 203 extends in the lateral direction of the vehicle. Further, the cavity of the recess 203 faces the front of the vehicle. The hook 204 is located in the vicinity of the front edge of the bottom surface 202 of the dashboard 20, and the hook 204 extends in the lateral direction of the vehicle. Furthermore, an end of the hook 204 extends toward the rear of the vehicle, and the defroster outlet 70 is disposed between the recess 203 and the hook 204.

The first duct has an upper edge which forms a first projection 301 and a second projection 302. The first projection 301 of the first duct 30 is mounted on the hook 204 of the dashboard 20, and the first projection 301 extends horizontally toward the front of the vehicle. The second projection 302 of the first duct 30 is inserted into the recess 203 of the dashboard 20, and the second projection 302 extends horizontally toward the rear of the vehicle. It is easy to install the first duct 30 on the bottom surface 202 of the dashboard 20, because the first projection 301 of the first duct 30 can be mounted on the hook 204 of the dashboard 20, and then the second projection 302 of the first duct 30 can be inserted into the recess 203 of the dashboard 20. That is, the second projection 302 can be pushed toward the front of the vehicle, since the duct 30 is somewhat elastic, so that the second projection 302 can be inserted into the recess 203. A seal member 304 is positioned between a lower edge 303 of the first duct 30 and a top edge of a second duct 305. This second duct 305 communicates with the heater 307. The heater 307 is placed under the dashboard 20, and the heater 307 heats the air. The blower 306 is positioned in the vicinity of the heater 307, and the blower 306 distribute the warm air to the defroster outlet 70 through the second duct 305 and the first duct 30.

The first duct 30 includes a screen 50 on the first projection 301 of the first duct 30. A front or first edge of the screen 50 is connected to a front edge of the first projection 301 of the first duct 30 by a hinge 40, and the hinge 40 is integrated with the first duct 30 and the cover plate 50. Therefore, the screen 50 can rotate about the hinge 40 on the first projection 301 of the first duct 30. The cover plate 50 has a lower surface which is in contact with the upper surface of the first projection 301 of the duct 30. Accordingly, the cover plate 50 extends horizontally from the upper peripheral edge of the first duct 30, when the cover plate 50 is bent back on the first projection 301 of the duct 30. Therefore, the cover plate 50 is supported horizontally under the bottom surface 202 of the dashboard 20 without any support for the other edge or second edge of the cover plate 50 which parallels the front or first edge of the cover plate 50. The opening 502 of the cover plate 50 is congruent with the defroster outlet 70, so that the warm air is distributed to the defroster outlet 70 through the opening 502 of the cover plate 50. Both ends of the bar 501 are fixed on an inner peripheral edge of the opening 502 of the cover plate 50, and a plurality of the bars 501 are located in a parallel relationship to each other. An intermediate portion of each bar 501 is placed in the defroster outlet 70. Thus, the cover plate 50 can prevent an object from dropping into the first duct 30 through the defroster outlet 70.

FIGS. 4 through 8 show a windshield defroster of a second embodiment. While most of the components in the second embodiment are the same as those previously described above for the first embodiment, the second embodiment has several differences.

Figure 4:
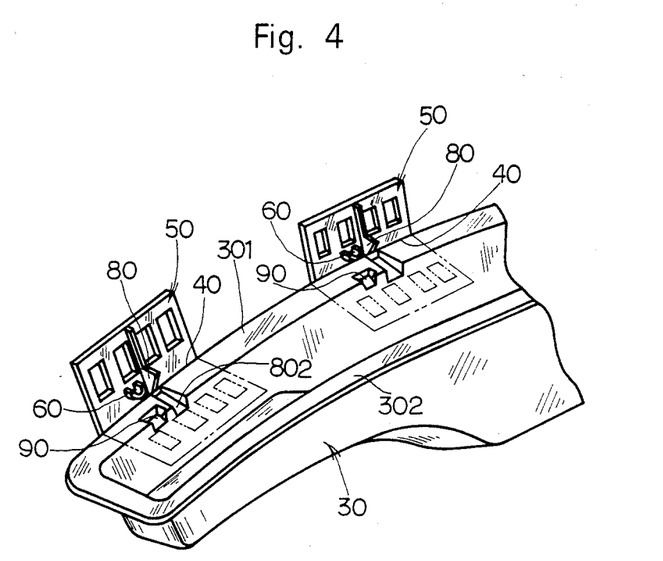
FIG. 4 is a partial perspective view showing a duct of a windshield defroster of a second embodiment.
Figure 5:
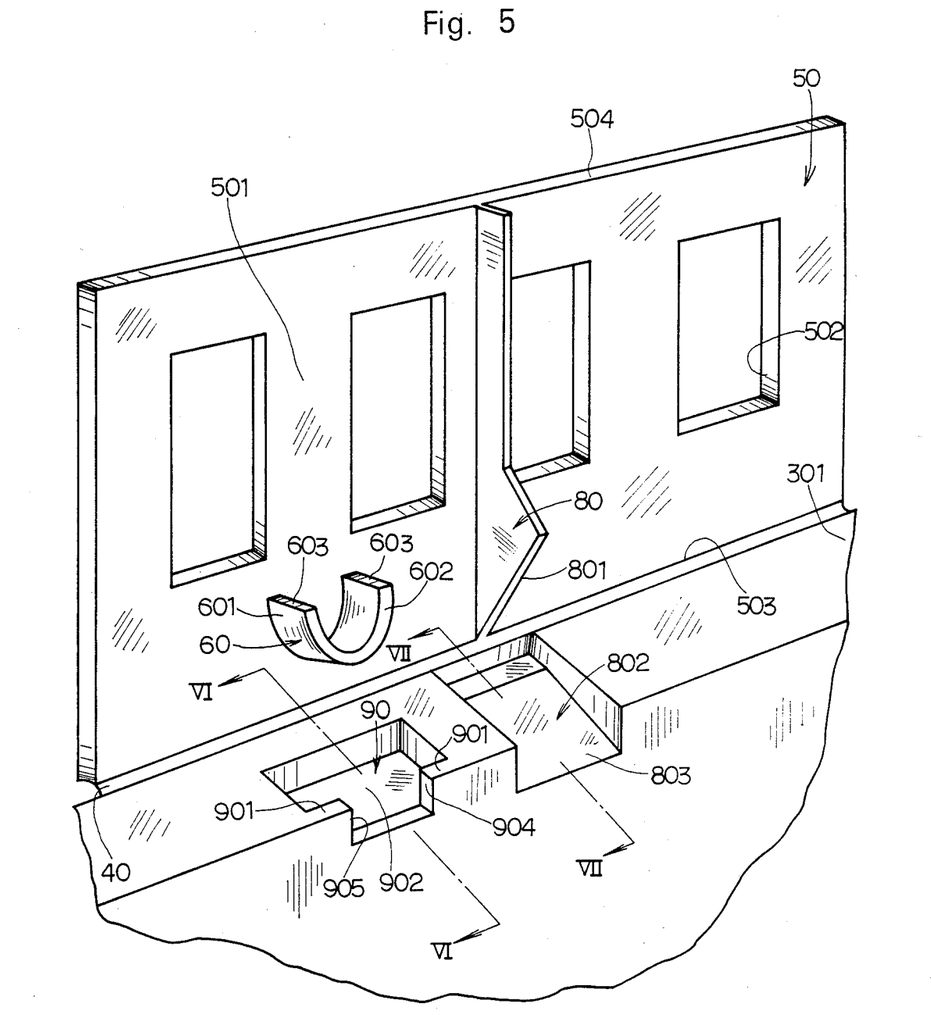
FIG. 5 is an enlarged partial perspective view showing a screen of the duct shown in FIG. 4.
Figure 6:
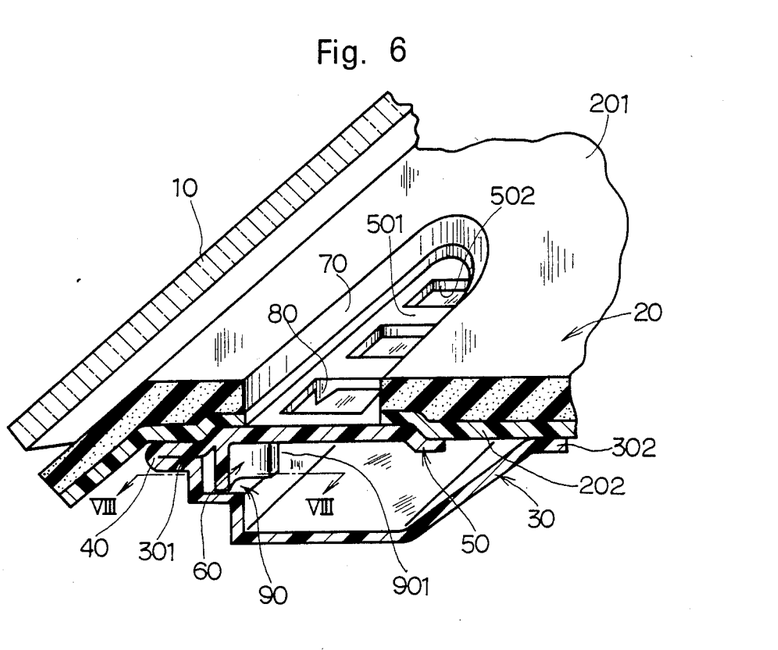
FIG. 6 is an enlarged partial cross-sectional view of the windshield defroster taken along the line VI—VI in FIG. 5, wherein the screen is bent back on the upper peripheral edge of a duct.

In the second embodiment, as shown in FIG. 4, a first duct 30 includes a plurality of screens 50 on a first projection 301 of the first duct 30, and as shown in FIG. 5, a first edge 503 of each screen 50 is connected to a front edge of the first projection 301 by a hinge 40. The hinge 40 is integrated with the first duct 30 and the cover plate 50, and the cover plate 50 includes an opening 502 which is separated by a plurality of bars 501.

Figure 7:
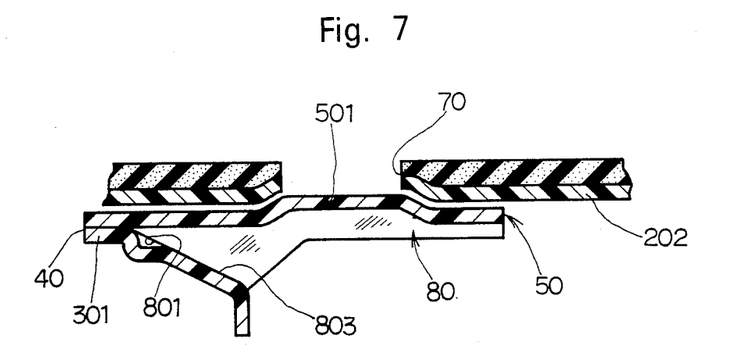
FIG. 7 is an enlarged partial cross-sectional view of the windshield defroster taken along the line VII—VII in FIG. 5, wherein the screen is bent back on the upper peripheral edge of the duct.

The cover plate 50 includes a reinforcement 80 at the lateral central portion of the cover plate 50. The reinforcement 80 extends from the first edge 503 to the second edge 504. The reinforcement 80 is fixed on the lower surface of the screen 50. Also, the reinforcement 80 extends downwardly and has a slanted edge 801 in the vicinity of the first edge 503 of the cover plate 50. The slanted edge 801 slantes to the left as shown in FIG. 7. The first duct 30 includes a first recess 802 in the upper peripheral edge thereof. A slanted bottom 803 is formed in the first recess 802, and the slanted bottom 803 slantes to the left as shown in FIG. 7. The first recess 802 is disposed in the vicinity of the reinforcement 80, so that the slanted edge 801 of the reinforcement 80 is in contact with the slanted bottom 803 of the first recess 802, when the cover plate 50 is positioned back on the first projection 301 of the first duct 30.

Therefore, the cover plate 50 is supported horizontally by the slanted edge 801 of the reinforcement 80 and the slanted bottom 803 of the first recess 802 without any support for the second edge 504 of the cover plate 50. However, the second edge 504 may be in contact with the bottom surface 202 of the dashboard 20. Thus, the cover plate 50 can prevent an object from dropping into the first duct 30 through the defroster outlet 70, even if the object is heavy.

As further shown in FIG. 5, the cover plate 50 includes a protrusion 60 on the lower surface thereof, and the protrusion 60 is formed in the shape of the letter 'U'. The protrusion 60 has a bottom end 602 and has two free ends 603. Furthermore, the protrusion 60 includes contact surfaces 601 on both sides in the vicinity of the two free ends 603 of protrusion 60.

Figure 8:
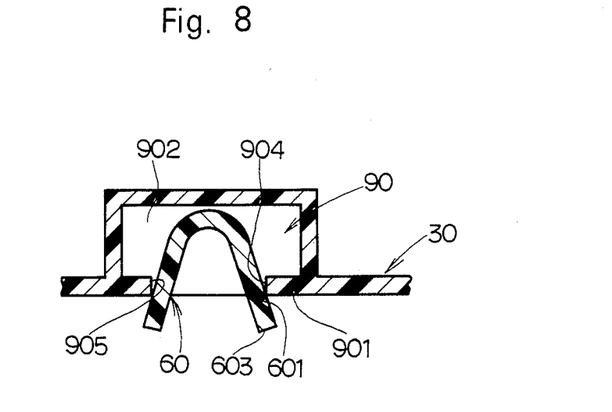
FIG. 8 is an enlarged partial cross-sectional view of the windshield defroster taken along the line VIII—VIII in FIG. 6.

The first duct 30 includes a second recess 90 in the upper peripheral edge thereof, and a horizontal bottom 902 is formed in the second recess 90. Two blocks 901 are raised within the second recess 90, and each block 901 has a contact side. The contact side 904 of block 901 faces the contact side 905 of the other block 901, and as shown in FIG. 8, both contact surfaces 601 of protrusion 60 are in frictional contact with the contact sides 904 and 905 of the respective blocks 901. Thus, the screen 50 is mounted securely on the first projection 301 of the first duct 30 by the protrusion 60 of the screen 50 and the second recess 90 of the first duct 30, and the cover plate 50 will not rotate about the hinge 40 since the protrusion 60 of the cover plate 50 has been inserted into the second recess 90. Therefore, it is not necessary for the defroster installer to concern himself with the cover plate 50 once the cover plate 50 is positioned back onto the first projection 301 of the first duct 30, and the protrusion 60 is inserted into the second recess 90.

As shown in FIG. 5, the bottom end 602 of the protrusion 60 is in contact with the horizontal bottom 902 of the second recess 90. Therefore, the bottom end 602 of the protrusion 60 and the horizontal bottom 902 of the second recess 90 prevent the screen 50 from bending past an imaginary horizontal plane of the vehicle.

Figure 9:
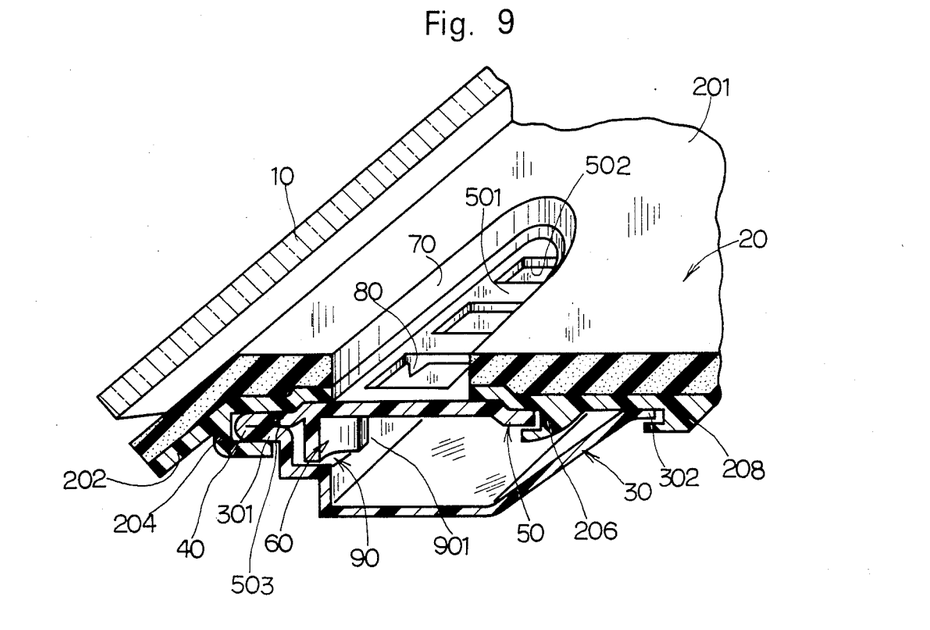
FIG. 9 is an enlarged partial cross-sectional view of a windshield defroster of a third embodiment taken along the line VI—VI in FIG. 5, wherein the screen is bent back on the upper peripheral edge of the duct.

FIG. 9 shows a windshield defroster of a third embodiment. While most of the components in the third embodiment are the same as those previously described for the second embodiment, the third embodiment has several differences.

In the third embodiment, a dashboard 20 includes a first hook 208, a second hook 204, and a third hook 206 on the bottom surface 202 of dashboard 20. The first hook 208 is formed on the central portion of the bottom surface 202, toward the rear of the vehicle, and the first hook 208 extends in the lateral direction of a vehicle. Also, an end of the first hook 208 extends toward the front of the vehicle. The second hook 204 is formed in the vicinity of the front edge of the bottom surface 202 of the dashboard 20, and the second hook 204 extends in the lateral direction of the vehicle. An end of the second hook 204 extends toward the rear of the vehicle. The third hook 206 is formed between the first hook 208 and the second hook 204, and the third hook 206 extends in the lateral direction of the vehicle. Also, an end of the third hook extends the front of the vehicle. Between the second hook 204 and the third hook 206, the dashboard 20 has a defroster outlet 70, and a cover plate 50 is placed under the defroster outlet 70. A first edge 503 of the screen 50 is connected to the front edge of the first projection 301 of the first duct 30, and the first edge 503 of the cover plate 50 and the front edge of the first projection 301 are mounted on the second hook 204. The second edge 504 of the cover plate 50 is mounted on the third hook 206, and a second projection 302 of the first duct 30 is mounted on the first hook 208.

Therefore, the first duct 30 and the cover plate 50 are mounted securely on the bottom surface 202 of the dashboard 20, so that the cover plate 50 can prevent an object from dropping into the first duct 30 through the defroster outlet 70, even if the object is heavy.

Figure 10:
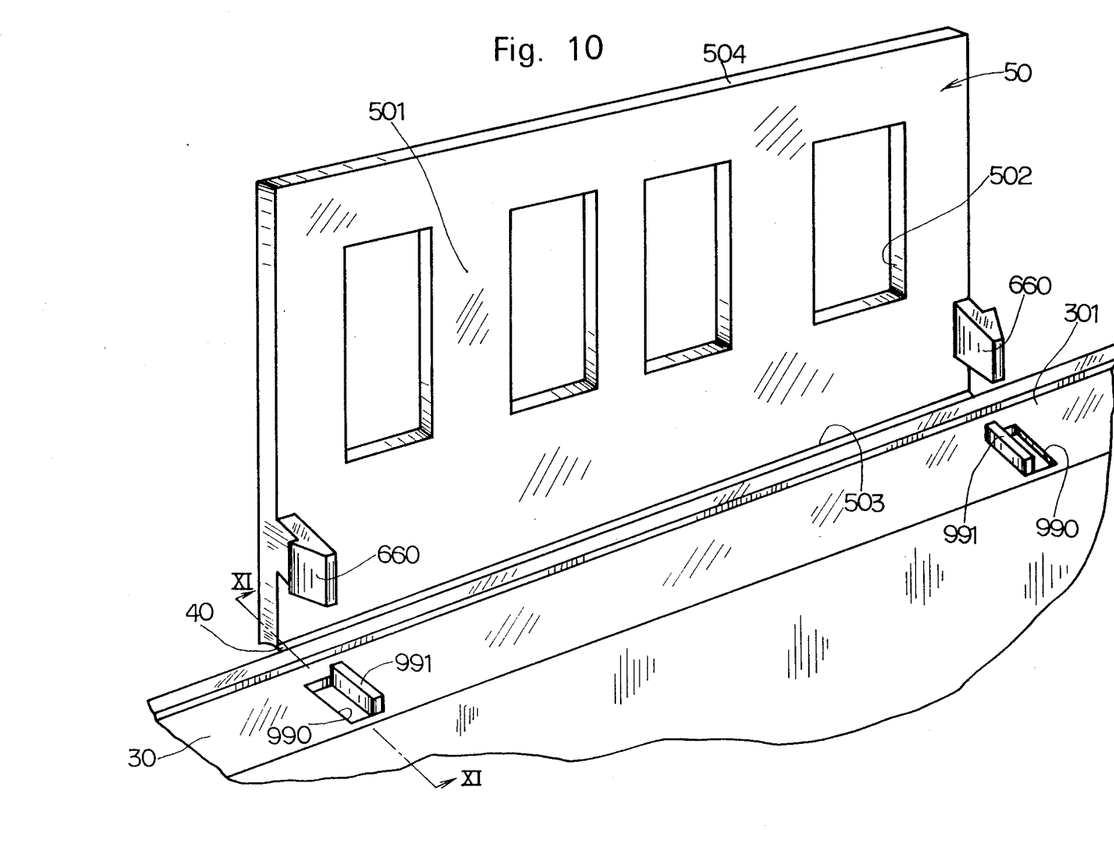
FIG. 10 is an enlarged partial perspective view showing a screen of a duct of a windshield defroster of a fourth embodiment.
Figure 11:
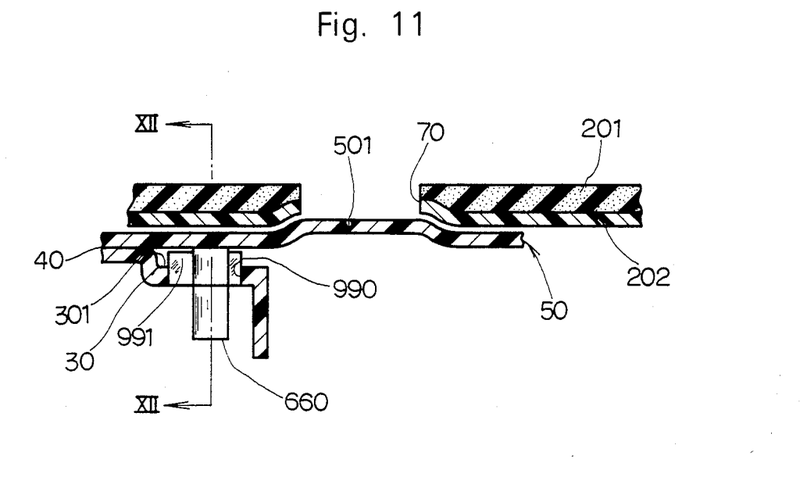
FIG. 11 is an enlarged partial cross-sectional view of the windshield defroster taken along the line XI—XI in FIG. 10, wherein the screen is bent back on the upper peripheral edge of the duct.
Figure 12:
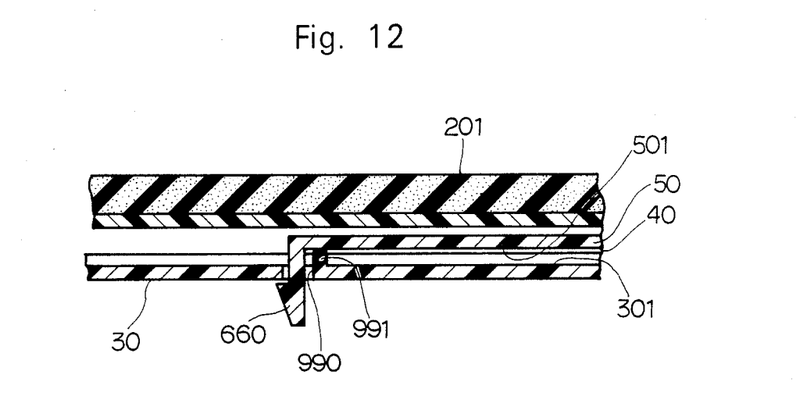
FIG. 12 is an enlarged partial cross-sectional view of the windshield defroster taken along the line XII—XII in FIG. 11.

FIGS. 10 through 12 show a windshield defroster of a fourth embodiment. While most of components in the fourth embodiment are the same as those previously described above for the second embodiment, the fourth embodiment has several differences.

In the fourth embodiment, as shown in FIG. 10, a cover plate 50 has a pair of projections 660 on the lower surface thereof, and the projections 660 are wedge-shaped. A first duct 30 includes a pair of holes 990 and a pair of props 991 on the upper peripheral edge of the first duct 30.

As shown in FIG. 11, each of the pair of the projections 660 is inserted into one of the holes 990, when the cover plate 50 is bent back onto the first projection 301 of the first duct 30.

As shown in FIG. 12, the lower surface of the cover plate 50 is supported by the prop 991, and the projection 660 of the screen 50 engages the hole 990 of the first projection 301 of the first duct 30.

Accordingly, the cover plate 50 is fixed securely on the first projection 301 of the first duct 30.

Therefore, the cover plate 50 can prevent an object form dropping into the first duct 30 through the defroster outlet 70, even if the object is heavy.

As herein-above described, the windshield defroster of the present invention can prevent an object from dropping into a duct through a defroster outlet, and this advantage can be obtained using less time and labor during the installation of the duct underneath the dashboard.

It should be apparent to those skilled in the art that the above-described embodiments are merely illustrative of a few of the many possible specific embodiments of the present invention. Various other arrangements can be readily devised by those skilled in the art without departing from the spirit and scope of this invention.

What is claimed is:

1. A windshield defroster assembly, comprising:
   a duct which conveys heated air from a heat source to a windshield, said duct having an upper peripheral edge defining a port;
   a cover plate positioned within said port, said cover plate having at least one opening and a first edge, said cover plate being smaller than the port of said duct;
   a hinge connecting said first edge of said cover plate to the upper peripheral edge of said duct, said hinge being integral with said cover plate and said duct, said cover plate being swingable about said hinge on said duct;
   at least one bar crossing over said at least one opening of said cover plate, said at least one bar having two ends, each end of said at least one bar being fixed to said cover plate, whereby said cover plate and said at least one bar prevent objects from dropping into said duct.

2. A windshield defroster assembly as set forth in claim 1, further comprising a dashboard having top and bottom surfaces and an opening therethrough defining a defroster outlet, said opening communicating with said port of said duct.

3. The windshield defroster assembly as set forth in claim 2, wherein said duct is fixed to said bottom surface of said dashboard.

4. A windshield defroster assembly as set forth in claim 3, further comprising a first projection extending horizontally from said upper peripheral edge of said duct, said first projection having a front edge, said cover plate having a lower surface, and said hinge being located between the first edge of said cover plate and said front edge of said first projection of said duct, whereby the lower surface of said cover plate is in contact with the first projection of said duct when said cover plate is bent back into the first projection of said duct, so that said cover plate is supported horizontally on the first projection of said duct.

5. A windshield defroster assembly as set forth in claim 4, wherein said cover plate has a surface area larger than that of said defroster outlet.

6. The windshield defroster assembly as set forth in claim 5, wherein said defroster outlet communicates with said at least one opening in said cover plate.

7. The windshield defroster assembly as set forth in claim 6, wherein said duct includes a plurality of cover plate secured to said front edge of said first projection of said duct.

8. A windshield defroster assembly, comprising:
   a duct which conveys heated air from a heat source to a windshield, said duct having an upper peripheral edge defining a port;
   a cover plate positioned within said port, said cover plate having at least one opening, a first edge, a lower surface, a second edge, said cover plate being smaller than the port of said duct;
   a hinge connecting said first edge of said cover plate to the upper peripheral edge of said duct, said hinge being integral with said cover plate and said duct, said cover plate, being swingable about said hinge on said duct;
   at least one bar crossing over said at least one opening of said cover plate in a direction perpendicular to said first edge of said screen, said at least one bar having two ends, each end of said at least one bar being fixed to said cover plate;
   a reinforcement fixed on said lower surface of said cover plate, said reinforcement being parallel to said at least one bar, whereby said cover plate and said at least one bar prevent objects from dropping into said duct.

9. A windshield defroster assembly as set forth in claim 8, further comprising a dashboard having top and bottom surfaces and an opening therethrough defining a defroster outlet, said opening communicating with said port of said duct.

10. The windshield defroster assembly as set forth in claim 9, wherein said duct is fixed to said bottom surface of said dashboard.

11. A windshield defroster assembly as set forth in claim 10, further comprising a first projection extending horizontally from said upper peripheral edge of said duct, said first projection having a front edge, said cover plate having a lower surface, and said hinge being located between the first edge of said cover plate and said front edge of said first projection of said duct, whereby the lower surface of said cover plate is in contact with the first projection of said duct when said cover plate is bent back onto the first projection of the duct, so that said cover plate is supported horizontally on the first projection of said duct.

12. The windshield defroster assembly as set forth in claim 10, wherein said reinforcement is perpendicular to the first edge of said cover plate and said reinforcement extends from the first edge of said screen to the second edge of said screen.

13. A windshield defroster assembly as set forth in claim 12, further comprises said reinforcement having a first edge, said duct having a first recess, and said first recess having a bottom surface on said upper peripheral edge of said duct, whereby when the cover plate is bent back onto the upper peripheral edge of said duct the first edge of said reinforcement is inserted into the first recess of said duct and the first edge of said reinforcement is in contact with the bottom surface of the first recess.

14. The windshield defroster assembly as set forth in claim 13, wherein said reinforcement is fixed on said bar.

15. A windshield defroster assembly comprising:
a duct which conveys heated air from a heat source to a windshield, said duct having an upper peripheral edge defining a port;
a cover plate positioned within said port, said cover plate having at least one opening, a first edge, a lower surface, a second edge, said cover plate being smaller than the port of said duct;
a hinge connecting said first edge of said cover plate to the upper peripheral edge of said duct, said hinge being integral with said cover plate and said duct, said cover plate being swingable about said hinge on said duct;
at least one bar crossing over said at least one opening of said cover plate in a direction perpendicular to the first edge of said cover plate, said at least one bar having two ends, each end of said at least one bar being fixed to said cover plate;
a recess formed on said upper peripheral edge of said duct;
a pair of blocks projecting from said recess; and
a protrusion fixed on said lower surface of said cover plate, said protrusion being in frictional contact with said pair of blocks, whereby said cover plate and said at least one bar prevent objects from dropping into said duct.

16. A windshield defroster assembly as set forth in claim 15, further comprising a dashboard having top and bottom surfaces and an opening therethrough defining a defroster outlet, said at least one opening communicating with said port of said duct.

17. The windshield defroster assembly as set forth in claim 16, wherein said duct is fixed to said bottom surface of said dashboard.

18. The windshield defroster assembly as set forth in claim 17, wherein said protrusion is formed in a letter "U" shape, and both free ends of said letter "U" shaped protrusion are in frictional contact with said pair of blocks.

19. A windshield defroster assembly as set forth in claim 18, wherein said cover plate has an upper surface being in contact with said bottom surface of said dashboard.

20. A windshield defroster assembly as set forth in claim 19, wherein said duct has a first projection which extends horizontally from said upper peripheral edge of said duct, and said bottom surface of said dashboard has a first hook, said first projection of said duct being mounted upon said first hook.

21. A windshield defroster assembly as set forth in claim 20, further comprises a second projection of said duct extending horizontally from said upper peripheral edge of said duct, in a direction opposite to said first projection of said duct and a second hook of said bottom surface of said dashboard supporting said second projection of said first duct.

22. A windshield defroster assembly as set forth in claim 21, further comprising a second edge of said cover plate being parallel to said first edge of said cover plate and a third hook of said bottom surface of said dashboard supporting said second edge of said cover plate.

23. The windshield defroster assembly as set forth in claim 22, wherein said third hook is located between said first hook and said second hook in a direction perpendicular to said dashboard.

24. The windshield defroster assembly as set forth in claim 23, wherein said defroster outlet is open between said first hook and said third hook of said bottom surface of said dashboard in a direction perpendicular to said dashboard.

25. The windshield defroster assembly as set forth in claim 17, wherein said pair of blocks project from a bottom surface of said second recess, and said protrusion on said cover plate has a bottom end which contacts said bottom surface of said second recess, whereby said cover plate is supported horizontally on said first duct.

26. A windshield defroster assembly as set forth in claim 25, further comprising a reinforcement fixed on said bar.

27. A method for assembling a windshield defroster assembly, comprising:
bending back a cover plate having at least one opening, a first edge, a second edge, and a lower surface on an upper peripheral edge of a duct conveying heated air from a heat source to a windshield, said cover plate being swingable on said duct by a hinge being integral with a portion of said upper peripheral edge of said duct and said first edge of said cover plate, said upper peripheral edge of said duct defining a port, said cover plate being smaller than said port of said duct, said cover plate having at least one bar crossing over said at least one opening in said cover plate; and
mounting said duct on a bottom surface of a dashboard, said dashboard having a top surface, said bottom surface and an aperture therethrough defining a defroster outlet, whereby said aperture communicates with said duct through said opening of said cover plate.

28. A method for assembling a windshield defroster assembly as set forth in claim 27, wherein said hinge assists in supporting said cover plate by preventing further bending of said screen about said upper peripheral edge of said duct.

29. A method for assembling a windshield defroster assembly as set forth in claim 28, wherein a reinforcement means parallels to said at least one bar is fixed on said lower surface of said cover plate, whereby said cover plate and said at least one bar prevent objects from dropping into said duct.

30. A method for assembling a windshield defroster assembly as set forth in claim 29, wherein said reinforcement is fixed on said bar.

31. A method for assembling a windshield defroster assembly as set forth in claim 28, wherein a second recess is provided on said upper peripheral edge of said duct, a pair of blocks project from said second recess, and a protrusion is fixed on said lower surface of said screen such that said protrusion is in frictional contact with said pair of blocks when said cover plate is bent about said portion of said upper peripheral edge of said duct.

32. A method for assembling a windshield defroster assembly as set forth in claim 31, wherein said pair of blocks project from a bottom surface of said second recess and said protrusion on said cover plate includes a bottom end which contacts said bottom surface of said second recess, whereby said cover plate is supported horizontally on said first duct.

* * * * *